Aug. 22, 1933.   S. HILLER ET AL   1,923,090
DEEP SEA FISHING
Filed Oct. 23, 1929
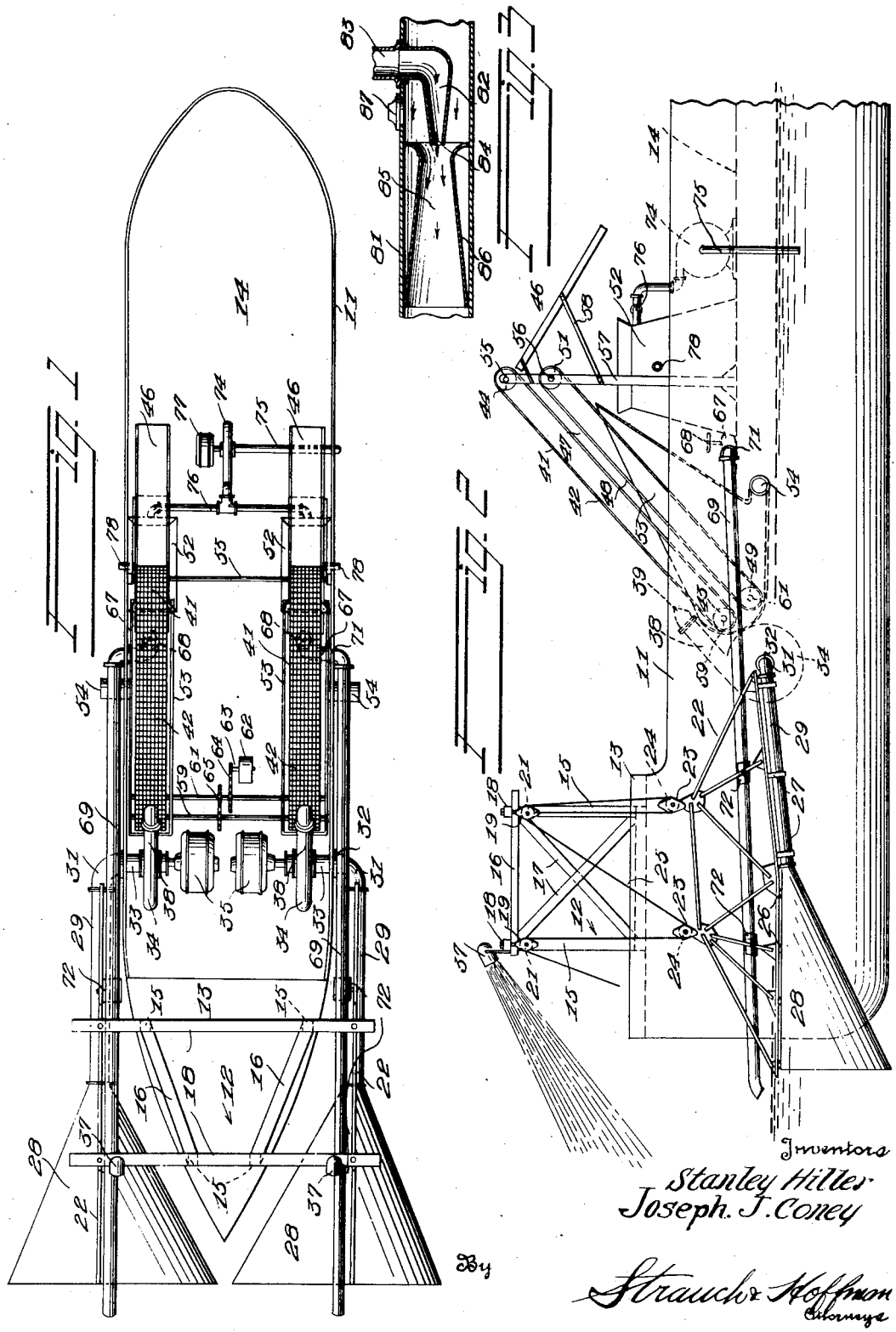
Inventors
Stanley Hiller
Joseph J. Coney
By Strauch & Hoffman
Attorneys Patented Aug. 22, 1933

1,923,090

UNITED STATES PATENT OFFICE 1,923,090

DEEP SEA FISHING

Stanley Hiller, Berkeley, and Joseph J. Coney, Alameda, Calif.

Application October 23, 1929. Serial No. 401,856

7 Claims. (Cl. 43—4)

The present invention relates to a method and apparatus for catching fish.

More specifically, the invention relates to a method and apparatus for catching fish by the so-called hydraulic method in which fish are drawn into a boat with a volume of water by a pumping action.

The present invention pertains to deep sea fishing and in especially adapted for catching fish adjacent the surface of the water in contradistinction to bottom sea fishing and is an improvement over methods and apparatus now in use for catching fish in this manner.

Hydraulic fishing, as heretofore practiced, involved the use of nets attached to vessels for capturing fish in a school and required conduits communicating with the nets and having suction means associated therewith for drawing water as well as the fish trapped in the nets onto or within the vessel.

It is known by those experienced in the art of deep sea fishing that fish are very sensitive to the approach of a boat or vessel, due probably to the water pressure caused by the approaching vessel, as well as the separating effect produced by the bow of the ship moving through the water.

In the methods and apparatus heretotfore employed for catching fish the movement of the vessel into proximity to a school of fish had a tendency to scare the fish due to the pressure in the water in advance of a vessel together with the parting movement of the water effected by the movement of the prow of the vessel through the water.

A primary object of the present invention is to provide a method and apparatus for catching fish which comprises the association with a vessel of means for drawing the fish into the vessel from points characterized by an absence of unusual pressure within the water in advance of the vessel due to its movement through the water.

A further object of the invention is to provide a method of catching fish, which comprises drawing the fish into a vessel under a rate of suction equaling or slightly exceeding the forward movement normally imparted to the water by movement of the vessel therethrough whereby the fish are not warned of the approaching vessel and are drawn toward instead of forced away from the approaching vessel.

A still further object of the invention is to provide apparatus for catching fish comprising means for trapping fish, means for drawing water with the trapped fish into said vessel under suction slightly exceeding the movement of the water effected by the movement of the vessel therethrough, means on the vessel for separating the fish according to size, and other means for conveying the smaller or bait fish into proximity to the prow of said vessel for attracting the fish within reach of suction trapping means.

A still further object of the invention is to provide a method of hydraulic fishing comprising the trapping of fish in means adjacent the prow of a moving vessel; drawing quantities of water with said trapped fish into said vessel under suction sufficient to offset the movement of the water caused by the movement of the vessel therethrough, separating the fish according to different sizes, returning the bait sized fish into proximity to said trapping means, and returning the smallest fish with the water drawn into said vessel through the sides of said vessel.

With the above objects in view as well as others that will become apparent during the course of the following disclosure reference will be had to the accompanying drawing forming part of same and in which is illustrated a preferred physical embodiment of apparatus suitable for carrying the method into effect and wherein:

Figure 1 is a top plan view of a boat or vessel having the improved apparatus associated therewith.

Figure 2 is a broken side elevational view of the construction illustrated in Figure 1.

Figure 3 is a longitudinal sectional view of a modified form of pumping construction.

Referring to the drawing by reference characters wherein like characters designate like parts, 11 designates in its entirety a conventional type of boat or vessel.

The vessel 11 adjacent the bow thereof is provided with a frame 12, which is preferably disposed upon a deck portion 13 in front of and above the main deck 14 as illustrated. The frame 12 may be of any suitable construction but preferably comprises vertically disposed members 15, the opposite lateral pairs of which are interconnected at the tops thereof by horizontal members 16, and which with members 16 are braced by intersecting members 17. The opposite members 16 are connected adjacent the outer ends of members 15 by transversely disposed members 18 which rigidly connect the opposite ends of the frame, and which, as indicated in Figure 1, project a substantial distance beyond members 16 with the opposite ends thereof projecting substantially beyond opposite sides of vessel 11 in longitudinal alinement.

Suitably secured to each end of transverse members 18 and depending therefrom is a pulley block 19 having a pulley 21 rotatably journaled therein.

Adjustably supported at each side of vessel 11 in transverse alinement with frame 12 is a steel truss member 22, each of which is provided with a pair of pulley blocks 23 having pulleys 24 rotatably journaled therein and disposed relative to pulleys 21 for the operative engagement of a truss supporting and lifting cable 25. Each cable 25 has one end thereof secured to one of the pulley blocks 19 and is continuously trained over right hand pulleys 24 and 21, viewing Figure 2, and left pulleys 24 and 21, with the free end thereof suitably secured to the vessel for maintaining truss member 22 in fixed position relative to frame 12, whereby either truss member 22 may be raised or lowered relative to frame 12 by pulling upon or relaxing cable 25.

Suitably secured to each truss member 22 as indicated at 26 and 27 is a funnel shaped member 28 and suction pipe or hose 29 having one end thereof secured to and communicating with the smaller end of funnel shaped member 28. Each of the suction pipes 29 at the rear end thereof is provided with an elbow 31 having a swivel connection 32 with the outer end of a pump pipe section 33 which end extends through the adjacent side of vessel 11 and the opposite end of which communicates with a centrifugal pump 34.

Each of the pumps 34 is driven by an electric motor, steam turbine, or other conventional means 35. The pumps 34 are of sufficient capacity and power units 35 of sufficient power that water will be drawn into funnel shaped members 28 and through suction pipes 29 at a rate and in sufficient volume to offset or slightly exceed the rate of movement of the water in advance of the vessel caused by movement thereof for a fixed rate of speed of the vessel thereby eliminating the otherwise present movement of the water in advance of the vessel which warns the fish of the approach of the vessel resulting in their fleeing from within range of the funnel shaped members 28.

While fish are sensitive to movements of the water, such as caused by the approach of a vessel and which is overcome by the present construction in the manner above set forth, fish are attracted toward a bright light and in order to make the present construction more effective a search light 37 is adjustably mounted on the forward transverse member 18 substantially above each funnel shaped member 28 for throwing a light onto the water in advance of each funnel shaped member 28 to attract the fish into position to be sucked in said members.

Each of the pumps 34, as indicated in Figure 2, has the discharge end 38 thereof projecting upwardly at a substantial angle and has the discharge end 39 thereof disposed in proximity to the lower end of an inclined conveyor 41, which is constructed of a large mesh endless band 42 movable over lower driven roller 43 and an upper idler roller 44. The water with the fish immersed therein is discharged from outlets 38 of pumps 34 onto conveyors 41 and the water and smaller fish pass through the heavy mesh bands 42, while the larger fish are carried upwardly by the conveyors 41 and discharged onto chutes 46 which are angularly disposed and guide the fish from conveyors 41 onto the deck 14. The smaller fish pass through the heavy mesh bands 42 of conveyors 41 and fall onto second conveyors 47 disposed inwardly of and parallel to conveyors 41 and in closely spaced relation thereto. Each conveyor 47 comprises a smaller mesh band 48 passing around a lower drive roller 49 and an upper idler roller 51. The fish which pass through bands 42, with the exception of the very small fish, are conveyed by conveyors 47 and discharged into receptacles 52 on deck 14 arranged beneath the upper ends of conveyors 47. The very small fish which pass through the mesh bands 48 together with the total volume of water discharged from pumps 34 enter receptacles 53 provided with tubular outlet members 54 extending through the respective sides of vessel 11 for discharging the water and very small fish into the body of water in which the vessel is sailing.

The idler rollers 44 and 51 are supported on transverse shafts 55 and 56 respectively whose opposite ends are supported in vertical uprights 57 suitably secured adjacent the inner ends thereof to the sides of vessel 11 and the chutes 46 are supported from uprights 57 by means of bars 58. The drive rollers 43 and 49 for conveyors 41 and 47 are secured to transverse shafts 59 and 61 which are driven in any suitable manner such as by a motor 62 as illustrated in Figure 1 the driving shaft 63 of which is provided with a sprocket pinion having driving connection with a sprocket wheel on shaft 61 by means of a sprocket chain 64. Rotative movement of shaft 61 is imparted to shaft 59 by means of a sprocket chain 65 operatively engaged with sprocket wheels on shafts 59 and 61, the sprocket wheels on shafts 59 and 61 being of like diameter whereby both shafts 59 and 61 will rotate at the same speed thus imparting uniform movements to conveyors 41 and 47.

Each of the receptacles 52 adjacent the base thereof is provided with an angular pipe section 67 provided with a valve 68 with one leg of section 67 extending through the adjacent side of vessel 11. A conduit 69 extends along each side of vessel 11 into proximity to truss member 22 and has a swivel connection at the rear end thereof with pipe section 67 as indicated at 71 with the forward end thereof disposed above and projecting slightly forwardly of the front end of the respective funnel shaped member 28. Each of the conduits 69 rests in a pair of saddles 72 secured to the respective truss member 22 for a purpose later referred to.

The smaller fish which are used as bait are discharged from conveyors 47 into receptacles 52 from which they are discharged through conduits 69 into the water in advance of funnel shaped members 28 for luring the fish into the path of said funnel shaped members upon opening of valves 68 and as it may not be necessary to convey all of the bait fish from receptacles 52, and, as it is desirable to keep the bait fish alive, the receptacles 52 are maintained to a predetermined level with fresh water which is effected in any suitable manner but preferably by a pump 74 suitably mounted on deck 14 and provided with an inlet pipe connection 75 through one side of vessel 11 and discharging through a joint pipe connection 76 into both receptacles 52 adjacent the top thereof, the pump 74 being driven by a suitable power unit 77. Each of the receptacles 52 is provided with an overflow connection 78 whereby the water pumped thereinto by pumps 74 will be maintained at a predetermined level.

In operation, the vessel 11 which moves at a substantially uniform rate of speed through the water is directed to the vicinity of schools of fish with funnel shaped members 28 and suction pipes 29 elevated by means of cables 25, when not in fish catching operation, or when the vessel is moving seaward and it is desired to have the apparatus in complete inoperativeness. Due to the sliding connection of conduits 69 in saddles 72 carried by truss members 22, the conduits will be elevated with the funnel shaped members and suction pipes.

When the fishing zone is reached, the funnel shaped members 28 and suction pipes 29 will be lowered by means of cables 25 to the postion indicated in Figure 2, in which it will be seen that the members 28 are preferably of such configuration that in operative position the upper sides thereof are substantially parallel with the water surface and the remaining side surfaces gradually incline outwardly to provide a relatively wide mouth for trapping large quantities of fish. It will be seen that as truss members 22 are lowered with members 28 and 29, that conduits 69 will lower by gravity therewith to the operative position indicated in Figure 2.

With the members 28, 29 and 69 in operative position as indicated, the motors 35 are set into operation and the vessel 11 steered through the water at a substantially uniform fixed rate of speed and the pumps 34 operated by motors 35 are of such capacity that water will be sucked into funnel shaped members 28 at a sufficient rate and in sufficient volumes to neutralize the action of the water in advance of or adjacent the prow of vessel 11 in order not to cause a fish warning disturbance in the water by the wave action set up in the water due to the movement of the vessel therein. The suction into members 28 is preferably such as to not only neutralize the disturbance of the water caused by movement of the vessel therethrough but provides a slight movement of the water toward the members 28 at a fixed uniform movement of vessel 11 in order that when a school of fish is encountered they will be influenced toward members 28 in the absence of the usual warning of the approaching vessel caused by the movement of the water in advance of the vessel.

The water with the immersed fish is discharged onto the lower ends of the conveyors 41, which, with conveyors 47, are moved at a constant or uniform speed by motor 62 and the larger sized fish or those desired for use are carried upwardly on conveyors 41 and discharged onto chutes 46 from which they slide onto deck 14. The water with the small and very small sized fish pass through the relatively large mesh belts 42 of conveyors 41 onto the conveyors 47 which hold and move the fish of bait size upwardly and deposit them in receptacles 52 from which bait fish are discharged through conduits 69 upon opening valves 68 during fishing operations for attracting fish to the mouths of members 28.

The water and very small fish pass through the small mesh belts 48 of conveyors 47 into receptacles 53 from which the water with the immersed very small fish are discharged through outlet members 54.

During fishing operations, the pump 74 is in operation by means of motor 77 for keeping receptacles 52 supplied with fresh water for the bait fish therein, and to maintain a constant head of water in said receptacle causing a uniform flow of water and bait fish from said receptacles.

The search lights 37 are focused onto the water in advance of members 28 especially at night time for further luring the fish into the path of the forwardly moving members 28.

The conduits 69 may if desired be in the form of flumes and the various mechanical constructions may be embodied in other forms than those specifically disclosed within the range of the scope of the claims appended hereto. claims appended hereto.

In Figure 3 is disclosed a construction which may, if desired, be substituted for pumps 34 and which comprises a pipe section 81 adapted for operative connection with the suction pipe 29 adjacent one end and adapted at the opposite end to discharge onto conveyor 41. The section 81 is provided with a nozzle 82 in communication with a pipe section 83 connected to a centrifugal pump similar to pump 34.

The restricted opening 84 of nozzle 82 communicates with a throat 85 in a tapered pipe section 86 adjacent nozzle 82 whereby a swift current is effected as indicated by the arrows at said throat for effectively forcing the water into the vessel through suction pipe 29 with which pipe section 81 is adapted to be connected. Pipe section 81 may be provided with a hand-hole 87 for providing ready access to the nozzle 82.

While we have disclosed but a single specific embodiment of our invention it is to be understood that such specific disclosure is merely illustrative and not restrictive, since the scope of the invention is defined by the terms of the subjoined claims rather than by the foregoing specific disclosure.

What we claim and desire to secure by United States Letters Patent is:—

1. A method of catching fish, which comprises forcing a volume of water and entrained fish into a moving vessel; seperating the fish with respect to different sizes thereof; discharging bait sized fish into the water at the forward end of said vessel and in front of the entrance of the water and fish; and discharging the water forced into said vessel with the very small fish into the body of water in which said vessel is sailing.

2. A method of hydraulic fishing comprising the following steps; moving a vessel into proximity to a school of fish; forcing a volume of water from the zone of said school of fish into said vessel; collecting the larger fish drawn in with said volume of water; conveying and discharging the smaller chumming or bait fish into the water at the forward end of said vessel and in front of the entrance of the water and fish; and discharging the volume of water to the body of water in which said vessel is sailing.

3. The method of fishing which consists in drawing the fish together with the water in which they are entrained in a vessel in movement, sorting the fish, and conveying and discharging the fish of bait size to a point at which said fish will lure larger fish toward the point from which the fish and water are drawn into said vessel.

4. In a method of catching fish by use of a vessel moving through a body of water, the step of discharging the smaller or chumming fish forced into the moving vessel to such a position with respect to the vessel that they will serve as bait fish to lure the larger fish desired into the entrance in the vessel.

5. In a method of catching fish, the steps of entraining a body of water containing fish of various sizes, separating out the smaller fish from the larger fish, and then discharging the smaller fish in front of the entrance for the body of water where they will serve as bait or lure fish to catch other larger fish.

6. Apparatus for hydraulic fishing comprising, in combination with a vessel having an opening adjacent the forward end thereof, a substantially funnel-shaped member arranged to be immersed in the water and communicating at its smaller end with the opening, suction means for forcing volumes of water and fish into said funnel-shaped member and into the vessel through said opening, means for collecting and separating the fish relative to size entrained in the water and forced into said vessel by said suction means, and means for discharging bait-sized fish forward of and adjacent the opening of said funnel-shaped member.

7. Fishing apparatus for a vessel comprising a funnel-shaped member disposed adjacent the bow of the vessel and opening into said vessel, means to draw water adjacent to said bow of the vessel into said vessel at a rate minimizing substantially the pressure exerted on the water by movement of said bow therethrough, means to sort the fish drawn into said vessel, and means to convey and discharge fish of a size suitable for bait in front of said funnel-shaped member.

STANLEY HILLER.
JOSEPH S. CONEY.